Feb. 19, 1963   V. L. BALSBAUGH   3,077,721
TREE LIMB SHAKER
Filed April 20, 1961   2 Sheets-Sheet 1
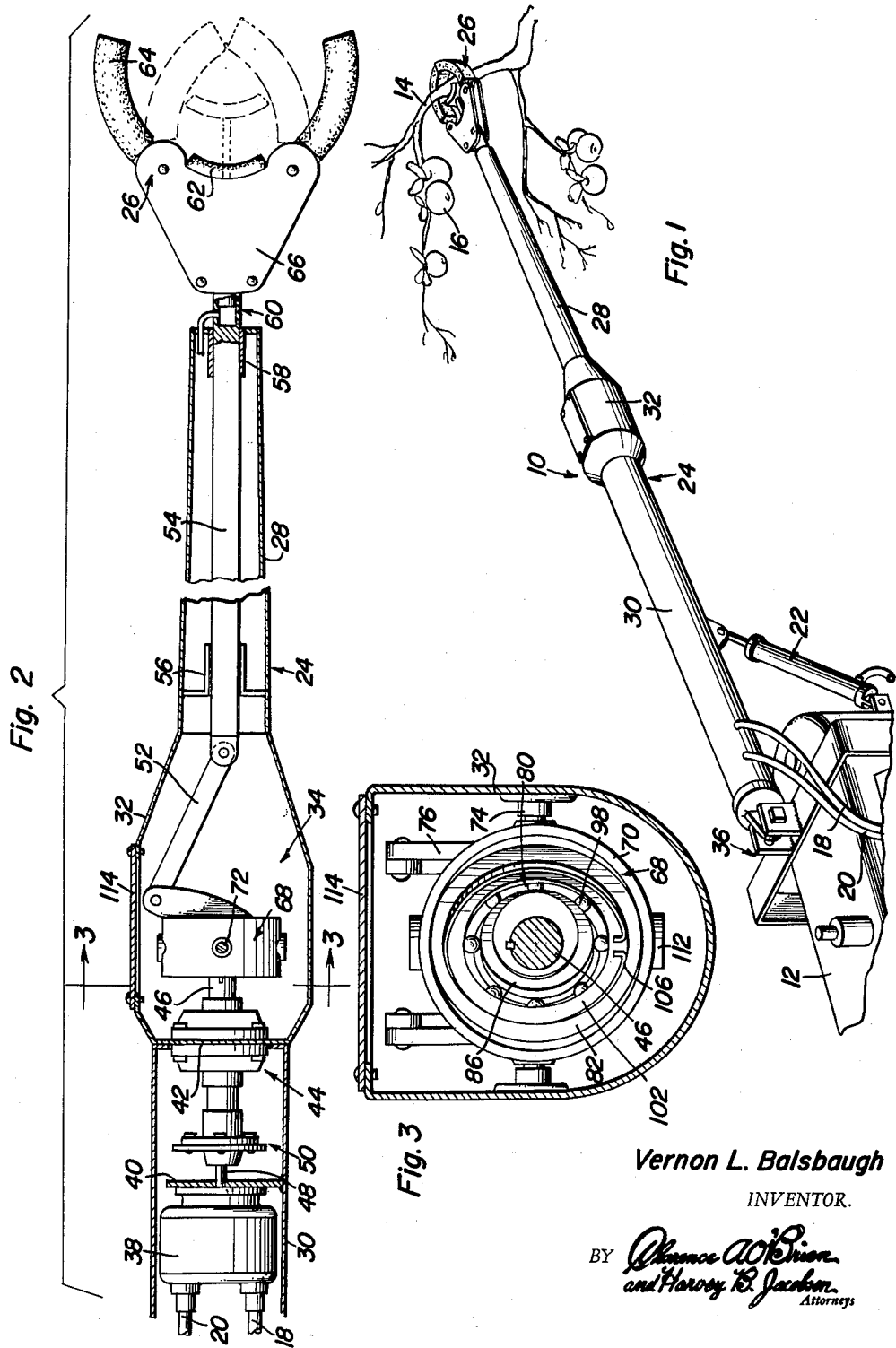
Vernon L. Balsbaugh
INVENTOR.
BY *Clarence A. O'Brien*
*and Harvey B. Jackson*
Attorneys Feb. 19, 1963  V. L. BALSBAUGH  3,077,721
TREE LIMB SHAKER
Filed April 20, 1961  2 Sheets-Sheet 2
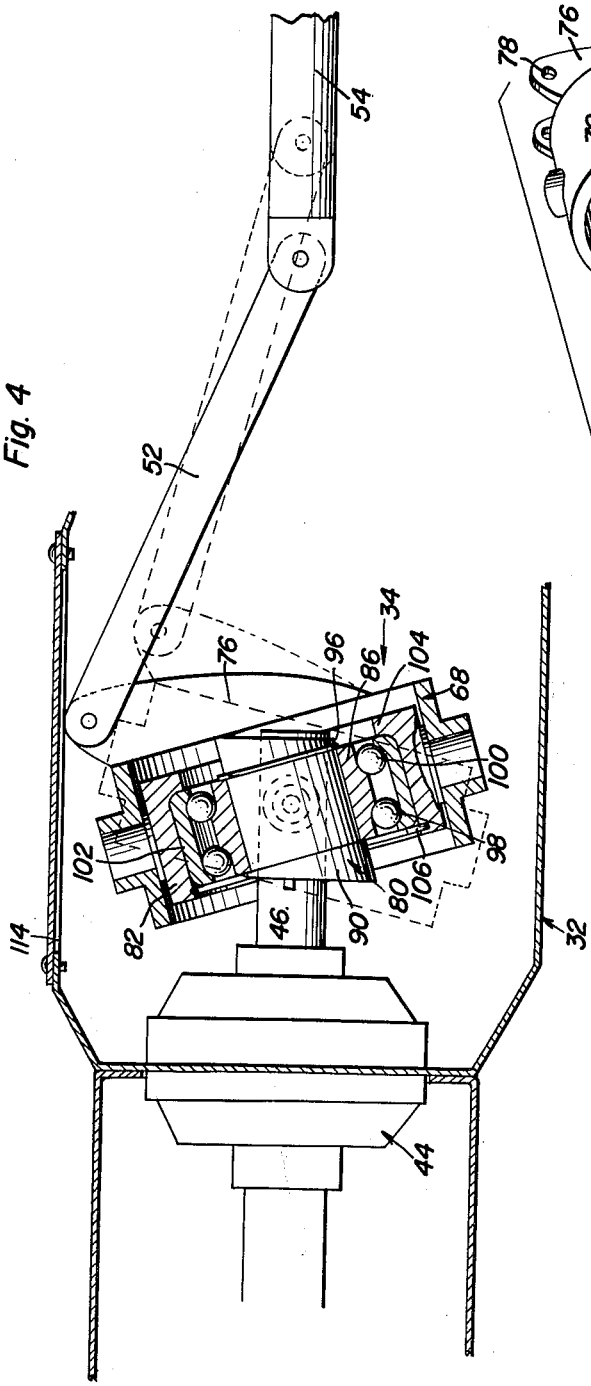
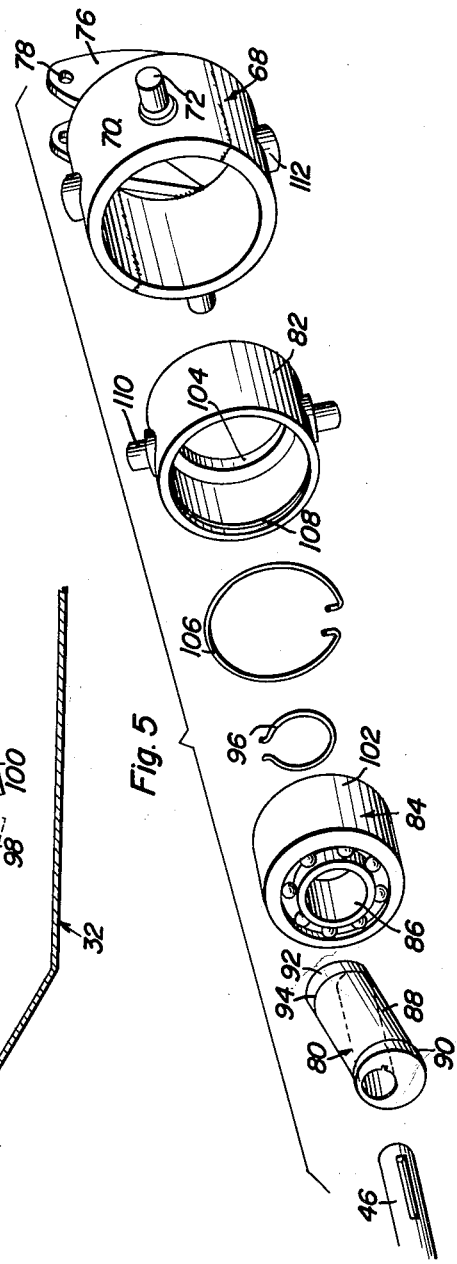
Vernon L. Balsbaugh
INVENTOR.

United States Patent Office 3,077,721
Patented Feb. 19, 1963

1

3,077,721
TREE LIMB SHAKER
Vernon L. Balsbaugh, Modesto, Calif., assignor to
Paul H. Balsbaugh, Modesto, Calif.
Filed Apr. 20, 1961, Ser. No. 104,311
8 Claims. (Cl. 56—328)

This invention relates to a mechanism for shaking fruit or the like from trees for harvesting purposes.

The present invention is concerned with tree limb shaker mechanisms which may be mounted on or suspended from any suitable carrier vehicle for the purpose of engaging limbs of a fruit or nut tree and vibrating the limbs so as to remove the produce from the tree. Shaker mechanisms heretofore used involved various types of eccentric mechanisms arranged to reciprocate or vibrate a shaker arm extending through an elongated boom to which a tree limb engaging mechanism was attached. The shaker mechanisms have been ineffiicent, and structurally large because of the necessity for transmitting the reciprocatory movement along the full length of the boom so as to require mechanism transmitting members of sufficient cross sectional area as to sustain the vibratory stresses and to keep deformation on the parts to a minimum. In addition to being inefficient by virtue of the size of the transmitting parts, shaker mechanisms heretofore were also costly as a result thereof. It is therefore a primary object of the present invention to provide a shaker mechanism, wherein the size of the load transmitting parts and the deformation of said parts and supporting structure is reduced to a minimum by means of a novel arrangement avoiding the use of dimensionally large and expensive components.

Another object of this invention is to provide a shaker mechanism for tree limbs utilizing a wobble plate drive unit through which rotary input motion is converted to reciprocatory movement for tree limb shaking purposes.

A further object of this invention is to provide a tree limb shaker mechanism utilizing a wobble drive which is pivotally mounted by the supporting boom so as to balance axial load thrust by pivotal displacement which will contribute to the vibratory reciprocal movement rather than reduce such movement as in the case of prior shaker mechanisms.

An additional object of this invention is to provide a shaker drive mechanism mounted adjacent to the outer end of its supporting boom structure whereby a reduction in elastic deformation is effected.

These together with other objects and advantages which will become subsequently apparent reside in the details of construction and operation as more fully hereinafter described and claimed, reference being had to the accompanling drawings forming a part hereof, wherein like numerals refer to like parts throughout, and in which:

FIGURE 1 is a partial perspective view showing the shaker mechanism of the present invention operatively mounted and engaged with a tree limb for shaking purposes.

FIGURE 2 is a partial sectional view of the shaker mechanism.

FIGURE 3 is a sectional view taken substantially through a plane indicated by section line 3—3 in FIGURE 2.

FIGURE 4 is an enlarged partial sectional view of the drive portion of the shaker mechanism.

FIGURE 5 is a perspective view of the disassembled parts of the shaker drive mechanism.

Referring now to the drawings in detail, it will be observed that the shaker mechanism which is generally referred to by reference numeral 10 in FIGURE 1 is shown mounted adjacent the forward end of a vehicle 12 for extension forwardly and upwardly therefrom for engagement with a tree limb 14 whereby the limb is vibrated to shake loose the fruit 16 when the shaker mechanism 10 is energized. It will be appreciated that any suitable type of mounting may be provided for the shaker mechanism which will make available a suitable source of power such as the hydraulic lines 18 and 20 and also a position adjusting mechanism such as the hydraulic mechanism 22. The shaker mechanism accordingly includes an elongated boom generally referred to by reference numeral 24 that may be adjustably positioned so that the tree limb engaging device 26 located at the remote end of the boom 24 may engage a tree limb as indicated in FIGURE 1.

Referring now to FIGURE 2 in particular, it will be observed that the boom includes a forward section 28 and a rear section 30 which are interconnected by an enlarged housing portion 32. The section 28 is relatively shorter than the section 30 so that the housing portion 32 within which the wobble drive unit 34 is located will be disposed closer to the tree limb engaging mechanism 26 than to the rear mounting end of the boom. Accordingly, it will be appreciated that the reciprocatory or vibratory drive imparted to the tree limb engaging device 26 will be transmitted from the housing portion 32 within which the wobble drive mechanism 34 is located through the forward section 28 to the device 26. The section 30 of the boom will therefore provide merely support for the forward section on the forward end of the carrier vehicle 12 by means of the mounting assembly 36 and will also enclose the hydraulic powerlines 18 and 20 by means of which the rotary hydraulic motor 38 is energized. The motor 38 is therefore mounted within the section 30 by a mounting plate 40 which is in close spaced relation to the rear end wall 42 of the housing portion 32. A bearing assembly 44 is mounted within the end wall 42 through which an input shaft 46 to the wobble drive mechanism 34 is journaled. The input shaft 46 is drivingly coupled to the output shaft 48 of the hydraulic motor 38 by means of a flexible coupling 50. It will therefore be apparent, that rotary motion imparted to the input shaft 46 by the hydraulic motor 38 will be converted into reciprocatory movement of the tree limb engaging device 26 by virtue of the oscillatory output movement of the wobble drive device 34 which is connected by a link member 52 to a connecting rod 54 which is connected at its forward end to the tree limb engaging device 26. Slide bearing assemblies 56 and 58 are therefore provided adjacent the opposite ends of the boom section 28 for the purpose of slidably mounting the connecting rod member 54. A hydraulic cylinder and piston device 60 may therefore be located within the forward end of the sliding rod member 54 for the purpose of forwardly projecting the pad element 62 and pivotally clamping the rubber covered arms 64 pivotally mounted on the hook member 66 for tree l'mb engaging purposes as shown by dotted lines in FIGURE 2. It will therefore be apparent, that fluid under pressure may be selectively supplied to the tree limb engaging device 26 for the purpose of engaging a tree limb once the boom 24 has been positioned relative thereto, after which the hydraulic motor 38 may be energized for vibrating the tree limb.

Referring now to FIGURES 4 and 5 in particular, it will be observed that the wobble drive mechanism 34 is unique in that the output member 68 thereof, is pivotally mounted about a horizontal axis fixed with respect to the housing portion 32 of the boom. The output member 68 therefore includes a cylindrical member 70 which may be formed in two sections and welded together or otherwise secured to each other for purposes of assembling the drive mechanism. A pair of pivot stub shafts 72 are secured to the opposite sides of the cylindrical member 70 in axial alignment with each other to define the aforesaid horizontal axis therethrough. Journal bearings 74 are therefore provided on the sides of the housing portion 32 for receiving the pivot stub shafts 72 as more clearly seen in FIGURE 3. Pivotal movement or oscillation of the output member 68 may thereby be accommodated. The output member 68 is connected to the link member 52 by means of a pair of forwardly projecting arms 76 which are pivotally connected to the rear end of a link member 52 by means of a pin extending through aligned apertures 78 in the arms 76 which are spaced above the axis extending through the pivot stub shafts 72. It will therefore be apparent, that the wobble drive mechanism 34 by imparting pivotal movement to the output member 68 will impart sliding reciprocation to the sliding rod member 54 through the link member 52. It will also be apparent, that the axial thrust load on the member 52 when transmitted back to the output member 68 will instead of tending to axially displace the member 68, will tend to pivotally displace the member 68, which pivotal displacement augments or contributes to the reciprocatory movement imparted to the sliding rod member 54 rather than to reduce its reciprocatory movement.

The drive mechanism 34 accordingly converts the rotational movement of the input shaft 46 into oscillatory movement of the output member 68. The shaft 46 therefore has splined thereto a bushing member 80, the axis of which is disposed at an angle to the rotational axis of the shaft 46, which rotational axis is aligned with the longitudinal axis of the sliding rod member 54. The angled bushing member 80 is so mounted and arranged on the shaft 46 that its inclined axis intersects the rotational axis through the shaft 46 at the same point with the intersection of the fixed horizontal axis through the pivot shafts 72 journaled in the sides of the housing portion 32, with the rotational axis. The bushing member 80 which is rotatably fast with the shaft 46 rotatably mounts about its inclined axis, an annular ring member 82 by means of a ball bearing assembly 84. The ball bearing assembly 84 includes therefore an inner race member 86 which is fixed to a central mounting portion 88 of the bushing member 80 and is axially shouldered against the rear portion 90 thereof. The forward portion 92 of the bushing member 80 is therefore provided with an annular groove 94 within which an O-ring element 96 is received for holding the inner race member 86 in axially assembled position. Two circumfeerntial series of spaced thrust bearings 98 and 100 are received on the inner race member 86 and within an outer race member 102. The outer race member 102 is therefore received within the annular ring member 82 between an inwardly projecting portion 104 thereof and the annular O-ring element 106 received within a groove 108 disposed in the internal surface of the annular ring member adjacent the rear end thereof. The annular ring member 82 has connected thereto a pair of radially projecting pivot pins 110 which are axially aligned with each other to define a diametral axis through the annular ring member 82. The pivot pins 110 are received within journal formations 112 disposed within the output member 68 in perpendicular intersecting relation to the axis through the pivot shafts 72. It will therefore be apparent, that the annular ring member 82 will undergo pivotal movement with respect to the fixed axis through the pivot shaft 72 in response to rotation of the shaft 46 and will at the same time be angularly displaced with respect to the output member 68 about an axis intersecting and perpendicular to the fixed axis through the pivot shaft 72. The drive bushing 80 will also be rotated relative to the annular ring member 82 about an axis inclined with respect to the rotational axis through the shaft 46 which intersects the rotational axis at its intersetcion with both the fixed axis through the pivot shafts 72 and the pivoting axis through the pivot pins 110. It will therefore be apparent that constrained reciprocatory movement will be imparted to the sliding connecting rod member 54 in response to rotation of the input shaft 46 with the stroke thereof being dependent upon the inclination of the axis through the bushing member 80 with respect to the rotational axis through input shaft 46. Accordingly, bushing members may be replaced with different inclinations for the axes thereof in order to obtain a different reciprocatory stroke for the tree limb engaging device 26.

From the foregoing description, operation and utility of the shaker mechanism of the present invention will be apparent. It will therefore be appreciated, that when the sliding rod member 54 engages a load the reaction thrust rather than tending to axially displace the drive mechanism, will tend to cause it to be pivotally displaced with respect to the fixed axis through the pivot shafts 72 which extend through the sides of the housing portion 32 of the boom. The pivotally displacing reaction will however be balanced by the rotational input of the input shaft 46 so that there will be no tendency for reduction in the reciprocatory vibration imparted by the drive mechanism to the tree limb engaging device 26.

It will also be appreciated, that the drive mechanism by virtue of its advantageous mounting for axial thrust load balancing purposes, may also be conveniently mounted closer to the load end of the boom so as to reduce the length of the power transmitting elements 52 and 54 which is of obvious advantage. Also, the enlarged housing portion 32 of the boom may be conveniently provided with an opening plate member 114 for easy replacement and repair of the drive mechanism 34. The foregoing arrangement of the drive mechanism utilizing a wobble plate drive, the output of which is pivotally mounted within the boom casing extends the utility of the shaker mechanism of the present invention to heavier duty applications for which comparable shaker mechanism drives heretofore used were unable to accommodate.

The foregoing is considered as illustrative only of the principles of the invention. Further, since numerous modifications and changes will readily occur to those skilled in the art, it is not desired to limit the invention to the exact construction and operation shown and described, and accordingly all sutiable modifications and equivalents may be resorted to, falling within the scope of the invention as claimed.

What is claimed as new is as follows:

1. A tree limb shaker comprising elongated boom means, tree limb engaging means reciprocably mounted at one end of the boom means, mounting means adjustably supporting the boom means at an opposite end thereof, power means extending into said boom means from said opposite end, and shaker drive means pivotally mounted within said boom means closer to said one end than to the opposite end to drivingly connect the power means to the limb engaging means for imparting reciprocatory movement to the limb engaging means, said shaker drive means comprises axial thrust balancing pivoting means operatively connected to the tree limb engaging means to impart sliding movement thereto in response to oscillation about a first axis fixed with respect to the boom means, and wobble drive means pivotally connected to the pivoting means about a second axis intersecting the first axis and fixed with respect to the pivoting means for oscillating the pivoting means in response to rotation by the power means.

2. The combination of claim 1, wherein said wobble drive means comprises a drive shaft axially aligned with said tree limb engaging means, an axial bushing member fixed to the shaft at a predetermined wobble stroke angle, and bearing means rotatably mounted on the bushing member in coaxial relation thereto for pivotal movement with respect to the boom means in response to rotation of the drive shaft and bushing member.

3. The combination of claim 2, wherein said bearing means includes radially projecting pivot pins for pivotal mounting thereof about said second axis within the pivoting means.

4. The combination of claim 3, wherein said pivoting means includes journal means for pivotally mounting the wobble drive means about said second axis perpendicular to the first axis, and a connecting arm link connected to the tree limb engaging means at a point radially spaced from the first axis.

5. The combination of claim 4, wherein said boom means includes an elongated hollow casing and slide bearing means disposed therein adjacent one end for slidingly mounting the tree limb engaging means, said casing included an enlarged portion adjacent the slide bearing means for pivotally mounting the shaker drive means therein.

6. A tree limb shaker comprising, elongated boom means, tree limb engaging means reciprocably mounted at one end of the boom means, mounting means adjustably supporting the boom means at an opposite end thereof, power means extending into sad boom means from said opposite end, and shaker drive means pivotally mounted within sad boom means closer to said one end than to the opposite end to drivingly connect the power means to the limb engaging means for imparting reciprocatory movement to the limb engaging means, said shaker drive means comprising axial thrust balancing pivoting means operatively connected to the tree limb engaging means to impart sliding movement thereto in response to oscillation about a first axis fixed with respect to the boom means, and wobble drive means pivotally connected to the pivoting means about a second axis intersecting the first axis and fixed with respect to the pivoting means for oscillating the pivoting means in response to rotation by the power means, journal means for pivotally mounting the wobble drive means about said second axis perpendicular to the first axis, and a connecting arm link on the pivoting means operatively connected to the tree limb engaging means at a point radially spaced from the first axis.

7. A tree limb shaker comprising an elongated boom, a tree limb engaging device, a connecting rod secured to said device and extending rearwardly into one end of said boom, power means in said boom rearward of the inner end of said connecting rod, an output shaft on said power means extending therefrom toward and in axial alignment with said connecting rod, shaker means pivotally mounted within said boom between said power means and said limb engaging device, said shaker drive means including a wobble drive means having an input shaft axially aligned with said connecting rod and said output shaft and drivingly coupled to said output shaft, an axial bushing member fixed to the input shaft at a predetermined wobble stroke angle, bearing means rotatably mounted on the bushing member in coaxial relation thereto, pivoting means concentric with said bearing means, means mounting said bearing means within said pivting means for pivotal movement about a second axis perpendicular to said first axis, and a connecting link arm pivotally secured at one end to said pivoting means at a point spaced from said first axis and at the second end to the inner end of the connecting rod for imparting reciprocatory movement to the limb engaging device.

8. The device of claim 7 wherein said limb engaging device includes movably mounted limb grasping means and means for effecting movement of the limb grasping means so as to secure a preselected limb therein.

References Cited in the file of this patent
UNITED STATES PATENTS 2,258,517    Rose    Oct. 7, 1941
3,013,374    Balsbaugh    Dec. 19, 1961